United States Patent
Shaw et al.

(10) Patent No.: US 9,862,063 B2
(45) Date of Patent: Jan. 9, 2018

(54) SUPERHYDROPHOBIC, OLEOPHOBIC AND ICE-PHOBIC FABRICS

(71) Applicants: Mark D. Shaw, Ponte Vedra Beach, FL (US); Paul Sander, Jacksonville, FL (US); Matt Clancy, Jacksonville, FL (US)

(72) Inventors: Mark D. Shaw, Ponte Vedra Beach, FL (US); Paul Sander, Jacksonville, FL (US); Matt Clancy, Jacksonville, FL (US)

(73) Assignee: ULTRATECH INTERNATIONAL, INC., Jacksonville, FL (US)

(*) Notice: Subject to any disclaimer, the term of this patent is extended or adjusted under 35 U.S.C. 154(b) by 293 days.

(21) Appl. No.: 14/605,121

(22) Filed: Jan. 26, 2015

(65) Prior Publication Data
US 2015/0210053 A1   Jul. 30, 2015

Related U.S. Application Data

(60) Provisional application No. 61/931,026, filed on Jan. 24, 2014.

(51) Int. Cl.

| | |
|---|---|
| *B64C 11/20* | (2006.01) |
| *B23P 9/00* | (2006.01) |
| *B29C 63/00* | (2006.01) |
| *B32B 5/02* | (2006.01) |
| *B32B 7/08* | (2006.01) |
| *B32B 7/12* | (2006.01) |

(52) U.S. Cl.
CPC ............ *B23P 9/00* (2013.01); *B29C 63/0017* (2013.01); *B32B 5/02* (2013.01); *B32B 7/08* (2013.01); *B32B 7/12* (2013.01); *B64C 11/205* (2013.01); *B29K 2995/0093* (2013.01); *B32B 2305/18* (2013.01); *B32B 2307/51* (2013.01); *B32B 2307/712* (2013.01); *B32B 2307/714* (2013.01); *B32B 2307/73* (2013.01); *B32B 2419/06* (2013.01); *B32B 2603/00* (2013.01); *B32B 2605/00* (2013.01); *Y02E 10/721* (2013.01); *Y02P 70/523* (2015.11); *Y10T 29/4973* (2015.01); *Y10T 29/49867* (2015.01); *Y10T 156/1028* (2015.01)

(58) Field of Classification Search
None
See application file for complete search history.

(56) References Cited

U.S. PATENT DOCUMENTS

| | | | | |
|---|---|---|---|---|
| 2,013,323 | A * | 9/1935 | Waner | B64C 3/26 244/121 |
| 2,434,208 | A * | 1/1948 | Gaugler | B64D 15/16 244/134 E |
| 4,314,892 | A * | 2/1982 | Stevens | C25D 5/56 205/158 |

(Continued)

*Primary Examiner* — Barbara J Musser
(74) *Attorney, Agent, or Firm* — Thomas C. Saitta

(57) ABSTRACT

Fabrics that have been treated to create superhydrophobic, oleophobic and/or ice-phobic performance are manufactured or assembled in specific conforming shapes so they can be positioned on or pulled over and around certain objects for the purpose of making those objects superhydrophobic, oleophobic and/or ice-phobic so they are self-cleaning, water proof, ice-resistant, oil-resistant, corrosion barriers, etc.

5 Claims, 2 Drawing Sheets

(56) References Cited

U.S. PATENT DOCUMENTS

| | | | |
|---|---|---|---|
| 2002/0082542 A1* | 6/2002 | Hall | A61F 5/01 |
| | | | 602/60 |
| 2012/0034094 A1* | 2/2012 | Wansink | B29D 99/0025 |
| | | | 416/230 |
| 2013/0294002 A1* | 11/2013 | Thompson | H05F 3/00 |
| | | | 361/212 |
| 2015/0133031 A1* | 5/2015 | Caden | A41C 1/08 |
| | | | 450/156 |

* cited by examiner

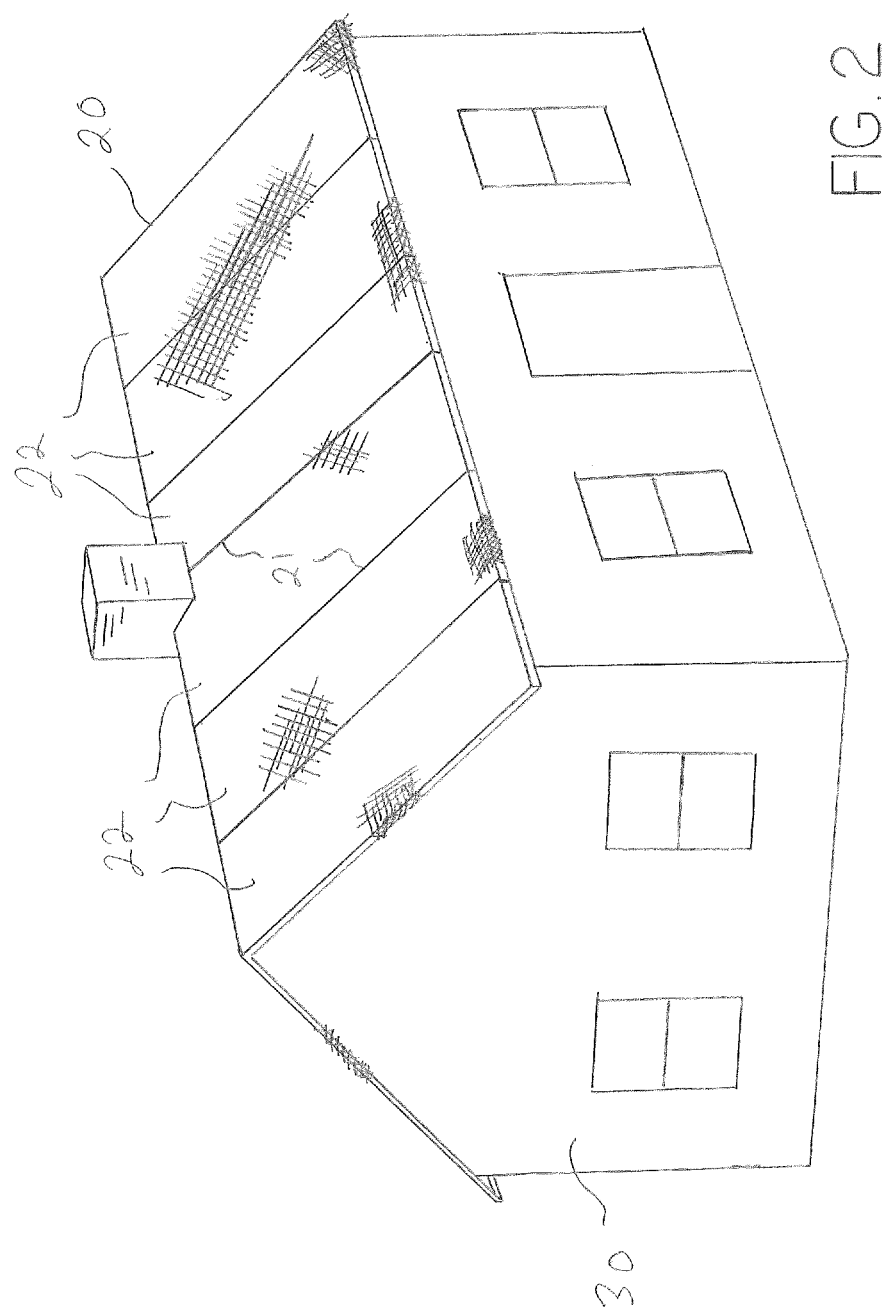

SUPERHYDROPHOBIC, OLEOPHOBIC AND ICE-PHOBIC FABRICS

This application claims the benefit of U.S. Provisional Patent Application Ser. No. 61/931,026, filed Jan. 24, 2104, the disclosure of which is incorporated herein by reference.

BACKGROUND OF THE INVENTION

This invention utilizes thin, superhydrophobic, oleophobic and/or ice-phobic fabrics that are fairly sheer, yet durable and have a tight weave to create a covering on three-dimensional substrates or objects that will create a durable, easy-to-apply, abrasion resistant, superhydrophobic, oleophobic and/or ice-phobic surface on the objects.

One of the biggest problems with coated or treated superhydrophobic, oleophobic and/or ice-phobic surfaces is the lack of durability and/or resistance to abrasion. This can reduce the life of the coatings so much that many promising applications cannot be considered, as the harsh effects of wind, water flow, sunlight, etc. severely shorten the useful life of the coating. Another issue associated with the coating of superhydrophobic, oleophobic and/or ice-phobic surfaces is the application process. In many cases these coatings are sprayed onto the surface and the quality of the coating is dependent on many factors, such as the experience and skill of the coater, the preparation of the surface, environmental conditions, coating preparation, etc. In addition, certain applications may be too difficult to achieve, such as for example coating the blades of large wind turbines. This invention seeks to address these problems and allow superhydrophobic, oleophobic and/or ice-phobic surfaces to be considered in applications that were previously not available for consideration.

SUMMARY OF THE INVENTION

This invention is in general a method of using fabrics that have been formed or treated in known manner to create superhydrophobic, oleophobic and/or ice-phobic surfaces for three-dimensional objects, particular for such objects that are not considered optimal candidates for applied coatings or treatments. The treated fabrics, herein referred to as skins, are cut and assembled into specific three-dimensional shapes conforming to the objects to be covered, or manufactured in conforming shape without assembly, then positioned and secured on the objects as a superhydrophobic, oleophobic and/or ice-phobic fabric skin to render the objects self-cleaning, waterproof, ice-resistant, oil-resistant, corrosion resistant, etc. The fabric may be composed of material having elastic properties whereby the fabric skin more readily conforms to the shape of the object being covered. When the superhydrophobic, oleophobic and/or ice-phobic characteristics of a current skin are diminished by exposure to the elements, age or other forces, or when the current skin itself excessively degrades from such exposure, the current skin can be easily removed and replaced with a new skin.

In other terminology, the invention is a method of providing a superhydrophobic, oleophobic and/or ice-phobic surface on a three-dimensional object comprising the steps of choosing a three-dimensional object for which a superhydrophobic, oleophobic and/or ice-phobic surface is desired; creating a skin having a shape conforming to said three-dimensional object, said skin comprising a fabric possessing superhydrophobic, oleophobic and/or ice-phobic properties; positioning said skin onto said three dimensional object. The method may further comprise the steps of removing said skin from said three-dimensional object and replacing said skin with another skin having a shape conforming to said three-dimensional object, said skin comprising a fabric treated to possess superhydrophobic, oleophobic and/or ice-phobic properties. The step of creating said skin may comprise the step of joining segments of said fabric together, possibly with fasteners, or may comprise choosing a fabric possessing elastic properties. The step of joining said fabric segments may comprise pre-assembling said fabric segments prior to positioning said skin onto said three-dimensional object or assembling said fabric segments on said three-dimensional object. The skin may also be bonded to the three-dimensional object.

BRIEF DESCRIPTION OF THE DRAWINGS

FIG. 2 is illustration of a representative assembled skin disposed on the roof of a house.

DETAILED DESCRIPTION OF THE INVENTION

Figure 1:
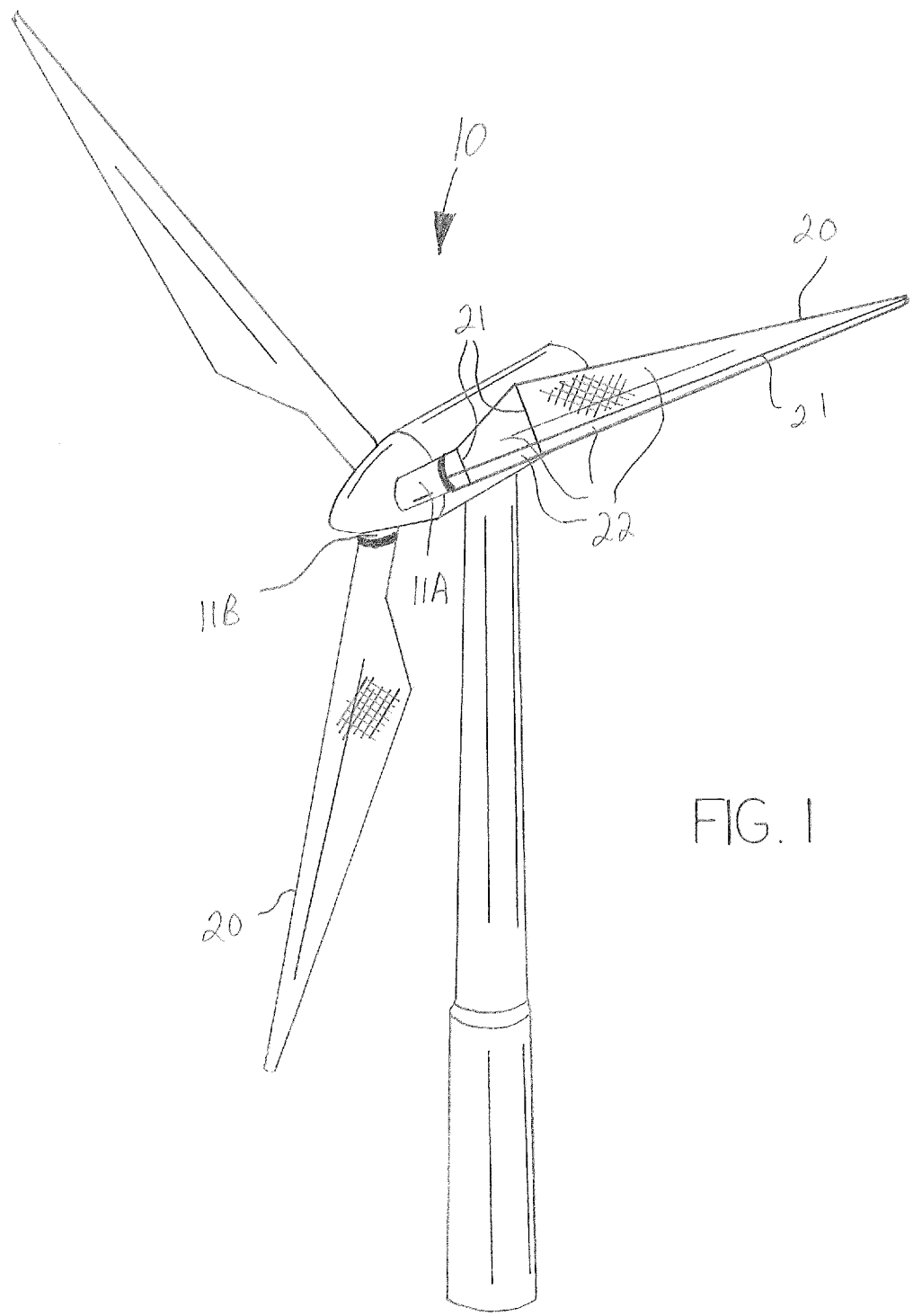
FIG. 1 is an illustration of a representative non-elastic skin disposed on one blade of a wind turbine and a representative elastic skin disposed on another of the blades.

This invention uses fabrics that have been treated to possess superhydrophobic, oleophobic and/or ice-phobic performance. The fabrics are manufactured in specific shapes corresponding to the objects to be covered so they can be pulled over, onto or around these objects, glued or adhered to certain substrates, or wrapped onto objects or substrates for the purpose of making those objects superhydrophobic, oleophobic and/or ice-phobic so they are self-cleaning, water proof, ice-resistant, oil-resistant, corrosion barriers, etc. The term "skin" shall be used herein to define the shaped fabric article. The skins may be easily removed for replacement or in circumstances where they are only needed short term.

Processes for the treatment of fabric to create superhydrophobic, oleophobic and/or ice-phobic performance, whereby the fabric possesses a large contact angle relative to water or other liquids, are well known. A large contact angle results in minimal or no wetting of the fabric itself, such that liquid is repelled rather than absorbed. For purposes of enablement of this disclosure, hydrophobic or superhydrophobic compositions and treatments suitable for this invention shall include but not be limited to the compositions and treatments disclosed in U.S Patent Publication Nos. 2013/0109261, 2012/0009396, 2010/0314575, 2012/0045954, and 2006/0029808, and also in U.S. Pat. Nos. 8,007,638, 6,103,379, 6,645,569, 6,743,467, 7,985,451, 8,187,707, 8,202,614, 7,998,554, 7,989,619, 5,042,991, 8,361,176, 8,258,206 and 6,723,378, and also in International Publication No. WO2013/058843.

In one embodiment, as illustrated on blade 11A of the wind turbine 10 of FIG. 1, the treated fabric is cut into segments 22 and then assembled to create the skin 20, which will possess a three-dimensional configuration. The fabric segments 22 are joined at the seams using known fasteners 21, for example by the use of mechanical members such as stitching, zippers, snaps or the like, or by the use of adhesive or heat bonding. For certain objects to be covered by the skins 20, the skins 20 may be pre-assembled and then positioned onto the objects, whereas for other objects possessing more complicated shapes the fabric segments 22 may be assembled directly onto the objects to form the skin 20. The skins 20 may be glued or otherwise bonded to the objects in circumstances where increased frictional resistance to wind or water may be needed to maintain the skin 20 on the object. When bonded, the material of bonding should be such that the skin 20 may be easily removed for replacement. FIG. 2 illustrates another example, wherein the skin 20 is positioned on the roof of a house 30, such that snow and water that may freeze into ice will be easily shed from the roof.

In another embodiment, as illustrated on blade 11B of the wind turbine 10 of FIG. 1, the fabric may be composed of elastic members or the weave of the fabric may be such that the fabric is elastic, such that the skin 20 may be pulled onto or over an object, the skin 20 stretching over larger areas of the object while retracting to conform to small areas. With such skins 20, it is essential that the dimensions of the weave not be so large as to excessively diminish the superhydrophobic, oleophobic and/or ice-phobic performance of the skin 20. In this example, the skin 20 is produced in a tube or sleeve shape such that it may be pulled onto the elongated blade member 11B.

The general methodology of the invention is to provide a superhydrophobic, oleophobic and/or ice-phobic skin 20 of suitable structure to conform to an object, position the skin 20 onto the object, remove the skin 20 from the object once the superhydrophobic, oleophobic and/or ice-phobic performance is reduced below acceptable standards, and replace the skin 20 with a second skin 20 likewise structured to conform to the object.

In addition to the above examples, the skins 20 could be used for example on airplane wings, motor vehicles, boats, or any other objects where long-term or temporary superhydrophobic, oleophobic and/or ice-phobic performance is desirable.

It is understood that equivalents and substitutions for certain elements or steps set forth above may be obvious to those of skill in the art, and therefore the true scope and definition of the invention is to be as set forth in the following claims.

We claim:

1. A method of providing a superhydrophobic, oleophobic and/or ice-phobic surface on a wind turbine blade comprising the steps of:
    choosing a wind turbine blade for which a superhydrophobic, oleophobic and/or ice-phobic surface is desired;
    creating a three-dimensional skin in the form of a tube or sleeve, said three-dimensional skin comprising an elastic fabric possessing superhydrophobic, oleophobic and/or ice-phobic properties; and
    pulling said three-dimensional skin onto said wind turbine blade whereby said three-dimensional skin conforms to said wind turbine blade.

2. The method of claim 1, further comprising the steps of removing said three-dimensional skin from said wind turbine blade and replacing said three-dimensional skin with another three-dimensional skin in the form of a tube or sleeve, said another three-dimensional comprising an elastic fabric possessing superhydrophobic, oleophobic and/or ice-phobic properties, by pulling said another three-dimensional skin onto said wind turbine blade whereby said another three-dimensional skin conforms to said wind turbine blade.

3. The method of claim 1, wherein said step of creating said three-dimensional skin comprises the step of joining segments of said elastic fabric together.

4. The method of claim 3, where said step of joining said elastic fabric segments comprises the step of using fasteners.

5. The method of claim 1, further comprising the step of bonding said three-dimensional skin to said wind turbine blade.

* * * * *